Patented June 10, 1952

2,599,640

UNITED STATES PATENT OFFICE 2,599,640

COPOLYMERS OF CHLOROTRIFLUORO-ETHYLENE, AN OLEFINIC HYDROCARBON AND A VINYL CARBOXYLATE

Robert M. Joyce, Jr., Wilmington, Del., assignor to E. I. du Pont de Nemours & Company, Wilmington, Del., a corporation of Delaware No Drawing. Application August 4, 1944, Serial No. 548,135

4 Claims. (Cl. 260—80.5)

This invention relates to new compositions of matter and more particularly to polymeric materials.

This invention has as an object the preparation of new high molecular weight polymers and of compositions containing them. Other objects will appear hereinafter.

These objects are accomplished by polymerizing in the presence of a peroxy catalyst a mixture of chlorotrifluoroethylene and a vinyl ester of an organic acid.

The following examples, in which the proportions of reactants are given in parts by weight, are illustrative of the practice of this invention.

Example I

A stainless steel high pressure reactor is swept with nitrogen and charged with 100 parts of deoxygenated water, 40 parts of vinyl acetate, and 0.2 part of benzoyl peroxide. The reactor is then closed, evacuated, and further charged with 30 parts of chlorotrifluoroethylene. The reactor is agitated and heated at 80° for 4 hrs. under autogenous pressure. It is then cooled, the pressure released and the product is discharged. The copolymer, when washed and dried, amounts to 30 parts and is found to contain 10.43% chlorine and 16.6% fluorine which corresponds to a chlorotrifluoroethylene/vinyl acetate copolymer having a mole ratio of chlorotrifluoroethylene: vinyl acetate of 1:2.6. The polymer softens at about 70° and clear films are obtained by hot pressing the polymer at 150° C. It has an intrinsic viscosity of 0.16 in xylene at 85° C.

Upon hydrolysis of a sample of this copolymer by dissolving the copolymer in hot toluene, adding a solution of potassium hydroxide in butanol, and refluxing for 1 hr., there is obtained a fluorine-containing modified polyvinyl alcohol.

Example II

A stainless steel high pressure reactor is flushed with nitrogen and charged with 25 parts of deoxygenated water, 3.5 parts of vinyl acetate and 0.1 part of benzoyl peroxide. The reactor is closed, evacuated and is further charged with 15 parts of chlorotrifluoroethylene. The reactor is agitated while heating for 12 hrs. at 80° C. under autogenous pressure. It is then cooled, the pressure released and the product discharged. The copolymer, when washed and dried, amounts to 14 parts and contains 22.37% chlorine which corresponds to a mole ratio of chlorotrifluoroethylene:vinyl acetate of 2:1. The copolymer softens at 70° and stiff, tough films having tensile strengths of 2700 lbs./sq. in. are prepared by hot pressing the polymer between steel plates covered with aluminum foil at 150° C. These films are exceptionally stiff, having a Young's modulus of 0.175.

Example III

A stainless steel high pressure reactor is flushed with nitrogen and then is charged with 25 parts of deoxygenated water, 35 parts of vinyl acetate and 0.1 part of benzoyl peroxide. The reactor is closed, evacuated, and is then further charged with 40 parts of chlorotrifluoroethylene under pressure. The reactor is agitated at 80° C. for 12¾ hrs. while maintaining a pressure of ethylene thereon of 460-700 atm. The reactor is then cooled, the pressure released and the product is discharged. There is obtained 32 parts of a tough rubbery copolymer. Analysis indicate that the copolymer contains a mol ratio of chlorotrifluoroethylene:vinyl acetate:ethylene of 1:5.1:18.

A sample (10 parts) of this polymer is compounded on a rubber mill with 4 parts of carbon black, 0.3 part of stearic acid, 1 part of zinc oxide, 0.6 part of sulfur, and 0.1 part of tetraethylthiuram disulfide. The compounded sample is then vulcanized by heating at 200° C. for 45 min. The vulcanized sample obtained is no longer tacky and has good toughness and recovery from stretch.

The vinyl acetate mentioned in the examples can be replaced by other vinyl carboxylates, examples of which are vinyl propionate, vinyl butyrate, vinyl benzoate and vinyl stearate. The most useful vinyl carboxylates are those of the formula RCOOCH=CH$_2$ where R is a hydrocarbon radical free from unsaturated linkages between acyclic carbon atoms. Polymeric products of particular value are obtained by including with the mixture of chlorotrifluoroethylene and vinyl carboxylate, another polymerizable unsaturated compound, and especially ethylene. These other polymerizable unsaturated compounds, namely, unsaturated organic compounds which contain ethylenic unsaturation and which can be converted to high molecular weight compounds, i. e., products having a degree of polymerization greater than a dimer or a trimer, comprise olefinic hydrocarbons such as ethylene, propylene, isobutylene and styrene; dienes such as butadiene, chloroprene, fluoroprene, and isoprene; vinyl halides such as vinyl fluoride and vinyl chloride; vinylidene halides, for example, vinylidene fluoride and vinylidene chloride; acrylic and methacrylic acids and their derivatives such as esters of lower aliphatic alcohols, for example methyl acrylate and methyl methacrylate, their anhydrides, their amides and their nitriles; and trifluoroethylene and tetrafluoroethylene.

The proportions of chlorotrifluoroethylene and vinyl carboxylate used in preparing the present polymers are 5% to 95% of chlorotrifluoroethylene and 95% to 5% of the vinyl carboxylate based on the weight of these two ingredients. When another polymerizable compound of the kind previously mentioned is included, it is added to the mixture in the proportions of from about 5% to 50% of the total weight of the three ingredients.

The polymerization can be effected in bulk, in solution, in organic solvents, such as t-butyl alcohol, cyclohexane, benzene, or methanol, or in mixtures of these with water, in aqueous dispersions or emulsions by the application of heat using a peroxy compound as catalyst. Compounds of this kind include diacyl peroxides such as benzoyl peroxide and lauroyl peroxide; diethyl peroxide, t-butyl hydroperoxide, hydrogen peroxide, ammonium persulfate, sodium persulfate, potassium persulfate and the like. These catalysts are used in amount of at least 0.01% and preferably not more than 5% by weight of the polymerizable monomers.

The polymerization is generally conducted at temperatures within the range of 40–200° C., depending upon the type of catalyst used. With a diacyl peroxide catalyst the best results are obtained at temperatures from 60° to 120° C., with dialkyl peroxide from 100° to 150° C., and with persulfates from 40° to 100° C. In general pressures above atmospheric, e. g., autogenous pressure, are employed.

The products of this invention are adapted to a variety of uses. They may be used in molding plastics, films, foils, fibers and adhesives. Fibers and films of the polymers of this invention can be used as insulating materials by wrapping the articles to be insulated. Solutions of the polymers can be used for electrical insulating coatings on wires and coils. Dispersions of the polymer can readily be prepared, for example from solutions of the polymer. For many of these purposes, the polymers may be combined with, or prepared in the presence of plasticizers, stabilizers, fillers, pigments, dyes, softeners, natural resins or other synthetic resins.

As many apparently widely different embodiments of this invention may be made without departing from the spirit and scope thereof it is to be understood that I do not limit myself to the specific embodiments thereof except as defined in the appended claims.

I claim:

1. A copolymer of chlorotrifluoroethylene, vinyl acetate and ethylene in which the chlorotrifluoroethylene: vinyl acetate: ethylene mole ratio is 1:5.1:18.

2. The copolymerization product of a mixture of 5% to 95% of chlorotrifluoroethylene and 95% to 5% of a vinyl carboxylate of the formula $RCOOCH=CH_2$ wherein R is a hydrocarbon radical free from unsaturated linkages between acyclic carbon atoms, based on the combined weight of those two ingredients, and 5% to 50% of an olefinic hydrocarbon from the group consisting of ethylene, propylene, isobutylene, and styrene, based on the combined weight of the three ingredients.

3. The copolymerization product set forth in claim 2 wherein said olefinic hydrocarbon is ethylene.

4. The copolymerization product of a mixture of 5% to 95% of chlorotrifluoroethylene and 95% to 5% of vinyl acetate, based on the combined weight of these two ingredients, and 5% to 50% of ethylene, based on the combined weight of the three ingredients.

ROBERT M. JOYCE, Jr.

REFERENCES CITED

The following references are of record in the file of this patent:

UNITED STATES PATENTS

| Number | Name | Date |
|---|---|---|
| 1,867,014 | Lawson | July 12, 1932 |
| 2,200,429 | Perrin | May 14, 1940 |
| 2,393,967 | Brubaker | Feb. 5, 1946 |
| 2,436,144 | Howk | Feb. 17, 1948 |

FOREIGN PATENTS

| Number | Country | Date |
|---|---|---|
| 796,026 | France | Mar. 27, 1936 |